US011188289B2

(12) United States Patent
Dory et al.

(10) Patent No.: US 11,188,289 B2
(45) Date of Patent: *Nov. 30, 2021

(54) IDENTIFICATION OF PREFERRED COMMUNICATION DEVICES ACCORDING TO A PREFERENCE RULE DEPENDENT ON A TRIGGER PHRASE SPOKEN WITHIN A SELECTED TIME FROM OTHER COMMAND DATA

(71) Applicant: HEWLETT-PACKARD DEVELOPMENT COMPANY, L.P., Houston, TX (US)

(72) Inventors: Jon R. Dory, Houston, TX (US); David H. Hanes, Fort Collins, CO (US); Jeri R. Culp, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/098,112

(22) PCT Filed: Jul. 29, 2016

(86) PCT No.: PCT/US2016/044678
§ 371 (c)(1),
(2) Date: Oct. 31, 2018

(87) PCT Pub. No.: WO2018/022085
PCT Pub. Date: Feb. 1, 2018

(65) Prior Publication Data
US 2019/0155566 A1 May 23, 2019

(51) Int. Cl.
G10L 15/183 (2013.01)
G10L 15/14 (2006.01)
(Continued)

(52) U.S. Cl.
CPC ............. *G06F 3/165* (2013.01); *G06F 3/167* (2013.01); *G10L 15/08* (2013.01); *G10L 15/22* (2013.01);
(Continued)

(58) Field of Classification Search
CPC ....... G10L 15/22; G10L 25/78; G10L 15/183; G10L 15/14; G10L 17/26; G06F 21/32
(Continued)

(56) References Cited

U.S. PATENT DOCUMENTS 8,687,820 B2  4/2014 Truong et al.
8,942,386 B2  1/2015 Marash et al.
(Continued)

FOREIGN PATENT DOCUMENTS

WO    WO-2016039992 A1    3/2016

OTHER PUBLICATIONS

Microphone Technology for Conference Rooms, Mar. 23, 2012, http://cloud.akg.com/9829/1377004309841_670_6.pdf.

Primary Examiner — Farzad Kazeminezhad
(74) Attorney, Agent, or Firm — Dicke Billig & Czaja PLLC

(57) ABSTRACT

In one example of the disclosure, volume level information is obtained for each of a set of connected communication devices that include a microphone and a speaker. The obtained volume level information is analyzed to determine the volume level information is indicative of a spoken trigger phrase. A preferred communication device among the set of communication devices is identified according to an
(Continued)

audio preference rule. The preferred communication device can engage in transactions with a virtual assistant service such that a user spoken data other than the trigger phrase is detected within a selected time of the trigger phrase, and a response is provided to the combination of the trigger phrase and the user spoken data.

15 Claims, 6 Drawing Sheets

(51) Int. Cl.
  *G10L 17/26* (2013.01)
  *G06F 21/32* (2013.01)
  *G06F 3/16* (2006.01)
  *G10L 15/22* (2006.01)
  *G10L 15/08* (2006.01)
(52) U.S. Cl.
  CPC .. *G10L 2015/088* (2013.01); *G10L 2015/223* (2013.01)

(58) Field of Classification Search
  USPC .......................................... 704/235; 715/727
  See application file for complete search history.

(56) References Cited

U.S. PATENT DOCUMENTS

| | | |
|---|---|---|
| 9,772,817 B2 * | 9/2017 | Jarvis ...................... G10L 15/14 |
| 2007/0112563 A1 | 5/2007 | Krantz et al. |
| 2014/0039888 A1 * | 2/2014 | Taubman .............. G10L 15/183 704/235 |
| 2014/0201639 A1 * | 7/2014 | Savolainen ............. G10L 17/26 715/727 |
| 2014/0222436 A1 | 8/2014 | Binder et al. |
| 2014/0330560 A1 | 11/2014 | Venkatesha et al. |
| 2015/0117671 A1 | 5/2015 | Chen et al. |
| 2017/0110144 A1 * | 4/2017 | Sharifi ..................... G06F 21/32 |
| 2018/0108351 A1 * | 4/2018 | Beckhardt ............... G10L 15/22 |
| 2019/0096398 A1 * | 3/2019 | Sereshki ................. G10L 25/78 |
| 2021/0060325 A1 * | 3/2021 | Xiao ................. A61M 37/0076 |

* cited by examiner

IDENTIFICATION OF PREFERRED COMMUNICATION DEVICES ACCORDING TO A PREFERENCE RULE DEPENDENT ON A TRIGGER PHRASE SPOKEN WITHIN A SELECTED TIME FROM OTHER COMMAND DATA

BACKGROUND

In today's world, users are increasingly utilizing technology-based devices, including smartphones, tablets, and personal computers, to access voice-accessible virtual assistant functions. Popular virtual assistant functions include enabling users to create actionable tasks according to voice instruction and performing such tasks by accessing search engines, email, SMS, electronic calendars, electronic contacts directories, and other applications.

DRAWINGS

DETAILED DESCRIPTION

Figure 1:
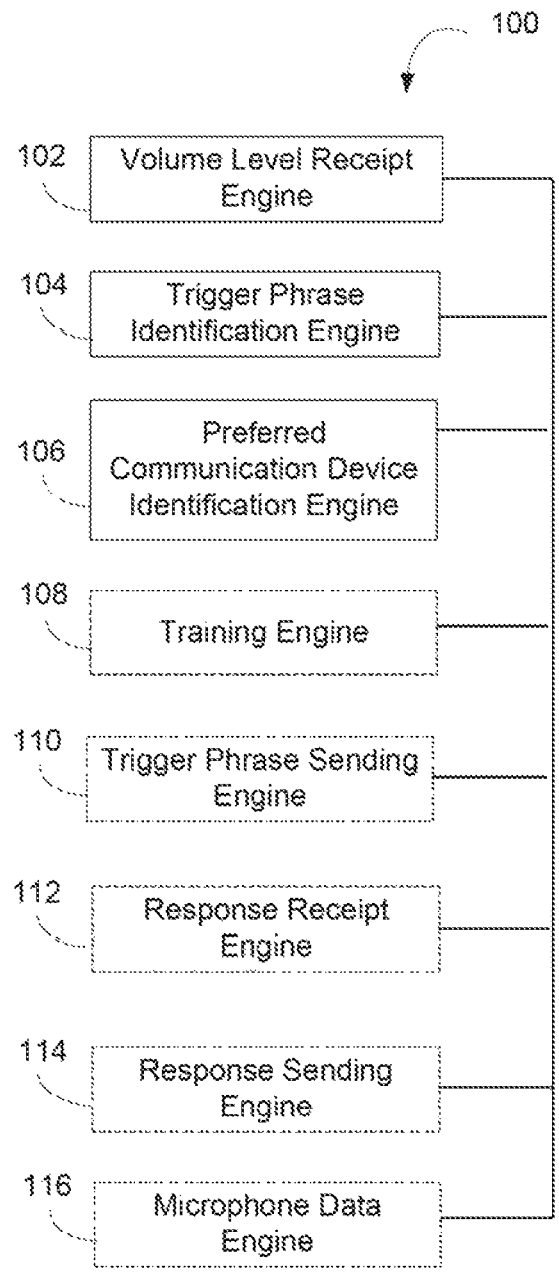
FIG. 1 is a block diagram depicting an example of an apparatus to enable identification of preferred communication devices.

In many situations cases users will desire to access a virtual assistant service via an application or via the internet to quickly obtain answers to questions regarding the user's calendar, local weather predictions, traffic conditions, sports scores, news, and other information. In some circumstances, to enjoy quick access to the virtual assistant service, a user may employ multiple communication devices connected to a computer that hosts, or is connected to, the virtual assistant service. For example, a user in a household may have one or more communication devices, each with a microphone and a speaker, in several rooms of the home.

However, this scenario can have several drawbacks. Commonly, an operating system at a PC or other computing device that hosts or is in connection with the virtual assistant service will recognize one default microphone device and one default speaker at any given time. In this scenario, while non-default microphone devices can still present a volume level ("VU") meter or other signal level readings to the computing device, microphone data would not flow to the computing device until a microphone is manually set as the "default microphone" device. Also, output data may not flow from the computing device to the communication device until a speaker is manually set as the "default speaker" device. In some situations, such manual selection of microphones and speakers may be seen as cumbersome and/or an impediment to using multiple communication devices to access the virtual assistant service.

To address these issues, various examples described in more detail below provide an apparatus and a method that enables effective and efficient identification of a preferred communication device. In one example, a computing device that is connected to a set of communication devices, with each device including a microphone and a speaker, and is to obtain volume level information for each of the communication devices of the set. The computing device is to analyze the obtained volume level information to determine that the volume level information is indicative of a spoken trigger phrase.

In examples, the trigger phrase is a predetermined phrase that is unique to a virtual assistant service, and when received at a system hosting the virtual assistant service is to wake the virtual assistant service. In examples, the system may be a system at another computing device, e.g., a server system or separate PC. In other examples, the system may be local, e.g., hosted at the same computing device that identifies the preferred communication device.

The computing device is to apply an audio preference rule to identify a preferred communication device among the set of communication devices. In examples, the audio preference rule may include audio volume, audio frequency, and/or other audio attributes as a factor.

In a particular example, the computing device is to perform a trigger phrase training operation that includes the computing device receiving a user spoken phrase that is the trigger phrase, and the computing device storing an audio volume signature for the trigger phrase. In these examples, after the training operation, the computing device may analyze obtained volume level information to determine that the volume level information is indicative of a spoken trigger phrase by comparing the obtained volume level information to the audio volume signature.

In certain examples, the computing device may, following the sending of the trigger data to the system that hosts the virtual assistant service, send to the system microphone data that is indicative of a question, instruction, or other user spoken phase captured at the preferred communication device. In this example, the computing device, having analyzed obtained volume level information to determine the volume level information is indicative of a spoken trigger phrase, and having utilized the volume level information to identify a preferred communication device, may send to a system that hosts a virtual assistant service trigger data indicative of the trigger phrase that will wake up the virtual assistant service and may also send to the system microphone data indicative of a user spoken phase that was captured at the preferred communication device. The computing device may in turn receive from the system a response phrase determined by the virtual assistant service. The computing device may then forward the response phrase to the identified preferred communication device for the preferred communication device to output via its speaker.

In this manner, then, the disclosed examples will enable automatic selection of a preferred communication device of a set of connected communication devices utilizing a user-spoken trigger phrase, such that the microphone and speaker of the identified preferred communication device will become the default input and output devices during user transactions with a virtual assistant service. In many circumstances, users should find this automated identification of a preferred communication device preferable to manual methods and systems. In this fashion multiple communication devices having a microphone and a speaker can be placed in an environment wherein a user is engaged in natural speech interaction and the communication device generating the strongest audio input level and the appropriate content (e.g., a trigger phase) can be selected as a default communication device. The disclosed method is dynamic in that that communication device selection can follow the user as the user changes locations within a multi-device environment. Users will enjoy the efficiency and ease of use made possible by the disclosed computing system and method, and utilization of remote communication devices to interact with virtual assistant service should be enhanced.

Figure 2:
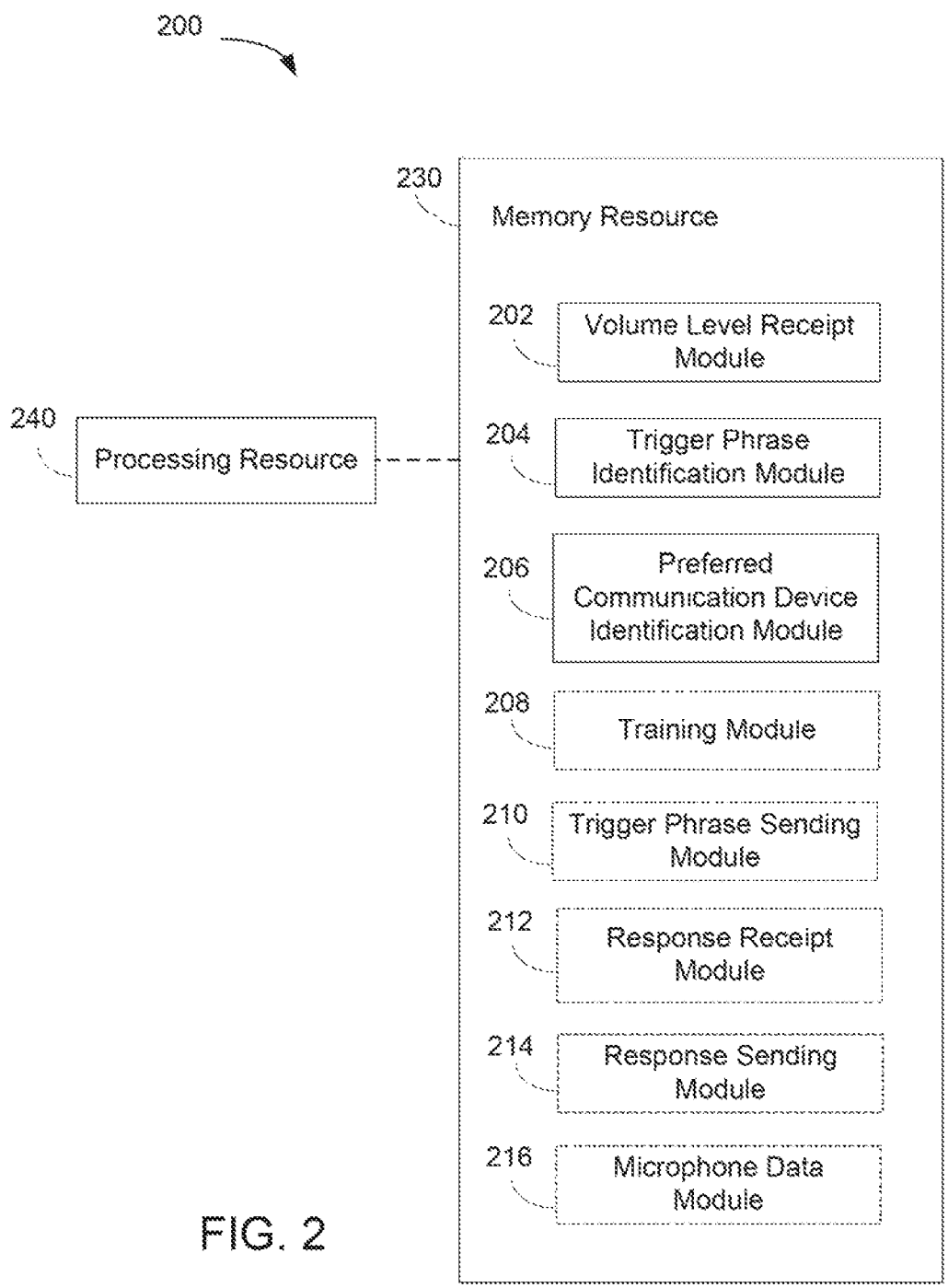
FIG. 2 is a block diagram depicting a memory resource and a processing resource to implement examples of a computing device to identify preferred communication devices.

FIGS. 1 and 2 depict examples of physical and logical components for implementing various examples. In FIG. 1 various components are identified as engines 102, 104, 106, 108, 110, 112, 114, and 116. In describing engines 102-116 focus is on each engine's designated function. However, the term engine, as used herein, refers generally to a combination of hardware and programming to perform a designated function. As is illustrated later with respect to FIG. 2, the hardware of each engine, for example, may include one or both of a processor and a memory, while the programming may be code stored on that memory and executable by the processor to perform the designated function.

FIG. 1 is a block diagram depicting components of a computing device 100 to enable identification of preferred communication devices. In this example, computing device 100 includes a volume level receipt engine 102, trigger phrase identification engine 104, preferred communication device identification engine 106, training engine 108, trigger phrase sending engine 110, response receipt engine 112, response sending engine 114, and microphone data engine 116. In performing their respective functions, engines 102-116 may access a data repository, e.g., a memory accessible to computing device 100 that can be used to store and retrieve data.

In an example, volume level receipt engine 102 represents generally a combination of hardware and programming to obtain volume level information for each of a set of connected communication devices, wherein each of the communication devices includes a microphone and a speaker. As used herein, a "communication device" refers generally to any combination of hardware and programming for transferring information and/or data. In a particular example, one or more of the communication devices may be powered by a battery and may be electronically connected to a computing device via a wireless network connection. As used herein, a "microphone" refers generally to any device converting sound waves into electrical energy variations, which may then be recorded or otherwise captured, amplified, or transmitted. As used herein, a "speaker" refers generally to any device that is to convert a received electrical audio signal into a corresponding sound. In examples, the communication device may include an interface. As used herein, an interface at a communication device refers generally to any combination of hardware and software that facilitates connection with another computing device via network. In examples wherein the network is a wireless network, the interface may be a network interface controller which connects to a radio-based computer network. Interface options for wireless networks include, but are not limited to, a USB dongle with a wireless network interface device, a Bluetooth™ interface card, or an infrared interface module. Alternatively, in an example in which the network is a wired network, the interface might be a token ring or Ethernet.

As used herein, "volume level information" refers generally to any representation of a measured signal level in audio equipment. In an example, volume level information may be a measurement of audio signal strength from the microphones of each of the set of communication devices, the measurement taken by a VU meter, a standard volume indicator ("SVI"), or any other device for displaying a representation of a signal level in audio equipment. In examples, a VU meter, a SVI, or other device for displaying a representation of a signal level in audio equipment may be included as an application or component of the computing device. In other examples, a VU meter, a SVI, or other device for displaying a representation of a signal level in audio equipment may be included in an apparatus separate from, but connected to, the computing device.

Trigger phrase identification engine 104 represents generally a combination of hardware and programming to analyze the obtained volume level information to determine that the volume level information is indicative of a spoken trigger phrase. As used herein, a "phrase" refers generally to a set of words (i.e. one or more words) that function as a unit or constituent to convey a thought or concept. As used herein a "word" refers generally to a meaningful element of speech or writing, typically to communicate a thought or concept. As used herein, a "trigger phrase" refers generally to a phrase that, when detected as having been spoken, is to cause a device (e.g., a communication apparatus, a computing device, or a system) or an application or service hosted by a device, to perform an action or initiate an event. In particular examples, a trigger phrase may be a phrase that is unique to a virtual assistant service hosted by a system. As used herein, "trigger data" refers generally to data that is indicative of a trigger phrase. As used herein "data" refers generally to representations in the form of digital electrical signals (including, but not limited to representations of quantities, characters, and symbols) upon which operations may performed by a computer (e.g., including, but not limited to read, write, and transmit operations).

In examples, trigger phrase identification engine 104 is to analyze the obtained volume level information to determine that the volume level information is indicative of a spoken trigger phrase, wherein the trigger phrase is a phrase unique to a particular virtual assistant service, e.g. a virtual assistant service of a particular product provider or service provider. As used herein, a "virtual assistant" or "virtual assistant service" refers generally to an application or other computer program that uses artificial intelligence to perform tasks or services for a user via a smartphone, notebook computer, desktop computer, or other computing device that is in electronic connection with the server system hosting the service. In examples, the tasks or services are performed based on user input, location awareness, and the ability to access information from a variety of online sources (such as weather or traffic conditions, news, stock prices, user schedules, retail prices, etc.).

In certain examples, trigger phrase identification engine 104, in analyzing the obtained volume level information to determine that the volume level information is indicative of a spoken trigger phrase, may determine the volume level information is within an expected frequency range. In examples determining that volume level information is within an expected frequency range may include comparing the volume level information to an audio volume signature. As used herein, an "audio volume signature" for a spoken trigger phrase refers generally to an audio volume snapshot, an audio volume profile, an acoustic volume fingerprint, or any other representation or audio volume characteristic for the spoken trigger phrase that can be used to identify or distinguish the trigger phrase amongst a set of phrases. For instance trigger phrase identification engine 104 may receive information that the expected trigger phrase has a particular frequency audio volume signature as measured by a VU meter, SVI, or another device for measuring and/or displaying a measurement of a signal level in audio equipment.

In certain examples, as discussed in the paragraph below, trigger phrase identification engine 104 may obtain the audio volume signature for the trigger phrase as the result of a training operation conducted at computing device 100 that causes a storage of the audio volume signature. In other examples, trigger phrase identification engine 104 may obtain the audio volume signature for the trigger phrase from a memory (e.g., accessing a stored database). In other examples, trigger phrase identification engine 104 may obtain the audio volume signature for the trigger phrase from another computing device, e.g., a computing device hosting an application or program that is to provide audio volume signature for a set of trigger words. In yet another example, trigger phrase identification engine 104 may obtain the audio volume signature for the trigger phrase from another computing device, e.g., a computing device hosting an application or program that is to provide audio volume signature for a generic set of words (e.g., a dictionary) or a phonetic alphabet.

Preferred communication device identification engine 106 represents generally a combination of hardware and programming to identify a preferred communication device among the set of communication devices according to an audio preference rule. As used herein, an "audio preference rule" refers generally to a rule or algorithm that can be used to prioritize a first communication device over a second communication device in consideration of audio attributes of the first and second communication devices. In certain examples, preferred communication device identification engine 106 in identifying the preferred communication device may assign scores to the each of the communication devices of the set of communication devices according to the audio preference rule. In a particular example, the applied audio preference rule is a rule that includes audio volume (e.g., as measured by a VU meter, SVI, or other device for displaying a representation of a signal level in audio equipment) as a factor.

In certain examples computing device 100 may include a training engine 108. Training engine 108 represents generally a combination of hardware and programming to receive a user spoken phrase that is the trigger phrase, and is to store an audio volume signature for the trigger phrase. In these examples, trigger phrase identification engine 104, in analyzing the obtained volume level information to determine the volume level information is indicative of a spoken trigger phrase, is to make the determination by comparing the obtained volume level information to the stored audio volume signature. In examples, the audio volume signature for the user spoken training phrase may be stored in, and subsequently obtained from, memory included within, or connected to, the computing device. In other examples, the audio volume signature for the user spoken training phrase may be stored by sending to another computing device for storage, and wherein retrieval of the audio volume signature may include the computing device sending a request message to the connected other computing device.

In certain examples computing device 100 may include a trigger phrase sending engine 110, a response receipt engine 112, and a response sending engine 114. Trigger phrase sending engine 110 represents generally a combination of hardware and programming to send trigger data indicative of the trigger phrase to a system hosting a virtual assistant service. As discussed previously, the hosting system may be a system local to, e.g., resident upon, computing device 100, or may be a system hosted by another connected computing device. Response receipt engine 112 represents generally a combination of hardware and programming to receive from the system that hosts the virtual assistant service a response phrase that was determined by the virtual assistant service. Response sending engine 114 represents generally a combination of hardware and programming to send the response phrase received by response receipt engine 112 to the preferred communication device for output via a speaker included within the preferred communication device.

In certain examples computing device 100 may include a microphone data engine 116. Microphone data engine 116 represents generally a combination of hardware and programming to receive from the preferred communication device microphone data that is indicative of an audio clip received at the preferred communication device. As used herein, "microphone data' refers generally to data that is indicative of a user spoken phrase detected at a microphone of a communication device that is other than the trigger phrase.

Microphone data engine 116 may in turn send the microphone data indicative of the captured audio dip to a system hosting the virtual assistant service, such that the virtual assistant service can determine the response phrase based at least in part upon the microphone data. In examples, the virtual assistant service may, upon receipt of the microphone data, process and/or analyze the microphone data to determine a user question or inquiry that was spoken to the communication apparatus. The virtual assistant service may then determine a response phrase for the question or inquiry, e.g., by accessing applications (e.g., search applications, weather applications, sports score applications, etc.) and/or by accessing the internet. The system hosting the virtual assistant service may then send the determined response phrase, indirectly or directly, to the computing device 100 via a network, e.g., for handling by response receipt engine 112.

In certain examples, the microphone data that microphone data engine 116 sends to the system hosting the virtual assistant service may be data that was buffered at the preferred communication device, and is indicative an audio clip that is a phrase spoken by a user immediately following utterance of the trigger phrase. In other examples, the microphone data received by microphone data engine 116 may be data that was buffered by the preferred communication device, and the microphone data may be indicative of an audio clip that is a phrase spoken by a user within a predetermined time period following utterance of the trigger phrase. In yet other examples, microphone data received by microphone data engine 116 may be data that was buffered by the computing device and may be indicative of an audio clip that is a phrase spoken by a user within a predetermined time period following utterance of the trigger phrase. These examples thus enable preservation of a user utterance (e.g., a request, instruction, or other communication for the virtual assistant service) that immediately follows, or follows within a predetermined time period, utterance of the trigger word at the preferred communication device. In this manner, a user utterance that might not otherwise have been received or understood by the computing device until after identification of the preferred communication device, may be promptly retrieved after such identification and in turn sent to the system that hosts the virtual assistant service for processing and return of a response phrase.

In examples, volume level receipt engine 102 may receive the volume level information for each of the set of connected communication devices over a link via a networking protocol. Trigger phrase sending engine 110 may send the trigger data indicative of the trigger phrase to a system hosting a virtual assistant service via a networking protocol. Response receipt engine 112 may receive the response phrase determined by the virtual assistant service over a link via a networking protocol. Response sending engine 114 may send the response phrase to the preferred communication device for speaker output over a link via a networking protocol. Microphone data engine 116 may receive the microphone data from the preferred communication device, and may send the microphone data to the system hosting the virtual assistant service, over a link via a networking protocol. In examples the utilized networking protocols may include, but are not limited to, Transmission Control Protocol/Internet Protocol ("TCP/IP"), HyperText Transfer Protocol ("HTTP"), and/or Session Initiation Protocol ("SIP").

As used herein, a "link" refers generally to an infrastructure or combination of infrastructures to enable an electronic connection, wireless connection, other connection, or combination thereof, to enable data communication between components and/or computing devices. Such infrastructure or infrastructures may include, but are not limited to, a cable, wireless, fiber optic, or remote connections via telecommunication link, an infrared link, or a radio frequency link. For example, a "link" may refer to or represent the internet, intranets, and intermediate routers, switches, and other interfaces. As used herein, a "computing device" may be a server, computer networking device, chip set, desktop computer, notebook computer, workstation, tablet computer, smartphone or another processing device or equipment. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

In the foregoing discussion of FIG. 1, engines 102-116 were described as combinations of hardware and programming. Engines 102-116 may be implemented in a number of fashions. Looking at FIG. 2 the programming may be processor executable instructions stored on a tangible memory resource 230 and the hardware may include a processing resource 240 for executing those instructions. Thus memory resource 230 can be said to store program instructions that when executed by processing resource 240 implement computing device 100 of FIG. 1.

Memory resource 230 represents generally any number of memory components capable of storing instructions that can be executed by processing resource 240. Memory resource 230 is non-transitory in the sense that it does not encompass a transitory signal but instead is made up of a memory component or memory components to store the relevant instructions. Memory resource 230 may be implemented in a single device or distributed across devices. Likewise, processing resource 240 represents any number of processors capable of executing instructions stored by memory resource 230. Processing resource 240 may be integrated in a single device or distributed across devices. Further, memory resource 230 may be fully or partially integrated in the same device as processing resource 240, or it may be separate but accessible to that device and processing resource 240.

In one example, the program instructions can be part of an installation package that when installed can be executed by processing resource 240 to implement computing device 100. In this case, memory resource 230 may be a portable medium such as a CD, DVD, or flash drive or a memory maintained by a server from which the installation package can be downloaded and installed. In another example, the program instructions may be part of an application or applications already installed. Here, memory resource 230 can include integrated memory such as a hard drive, solid state drive, or the like.

In FIG. 2, the executable program instructions stored in memory resource 230 are depicted as volume level receipt module 202, trigger phrase identification module 204, preferred communication device identification module 206, training module 208, trigger phrase sending module 210, response receipt module 212, response sending module 214, and microphone data module 216. Volume level receipt module 202 represents program instructions that when executed by processing resource 240 may perform any of the functionalities described above in relation to volume level receipt engine 102 of FIG. 1. Trigger phrase identification module 204 represents program instructions that when executed by processing resource 240 may perform any of the functionalities described above in relation to trigger phrase identification engine 104 of FIG. 1. Preferred communication device identification module 206 represents program instructions that when executed by processing resource 240 may perform any of the functionalities described above in relation to preferred communication device identification engine 106 of FIG. 1. Training module 208 represents program instructions that when executed by processing resource 240 may perform any of the functionalities described above in relation to training engine 108 of FIG. 1. Trigger phrase sending module 210 represents program instructions that when executed by processing resource 240 may perform any of the functionalities described above in relation to trigger phrase sending engine 110 of FIG. 1. Response receipt module 212 represents program instructions that when executed by processing resource 240 may perform any of the functionalities described above in relation to response receipt engine 112 of FIG. 1. Response sending module 214 represents program instructions that when executed by processing resource 240 may perform any of the functionalities described above in relation to response sending engine 114 of FIG. 1. Microphone data module 216 represents program instructions that when executed by processing resource 240 may perform any of the functionalities described above in relation to microphone data engine 116 of FIG. 1.

Figure 3:
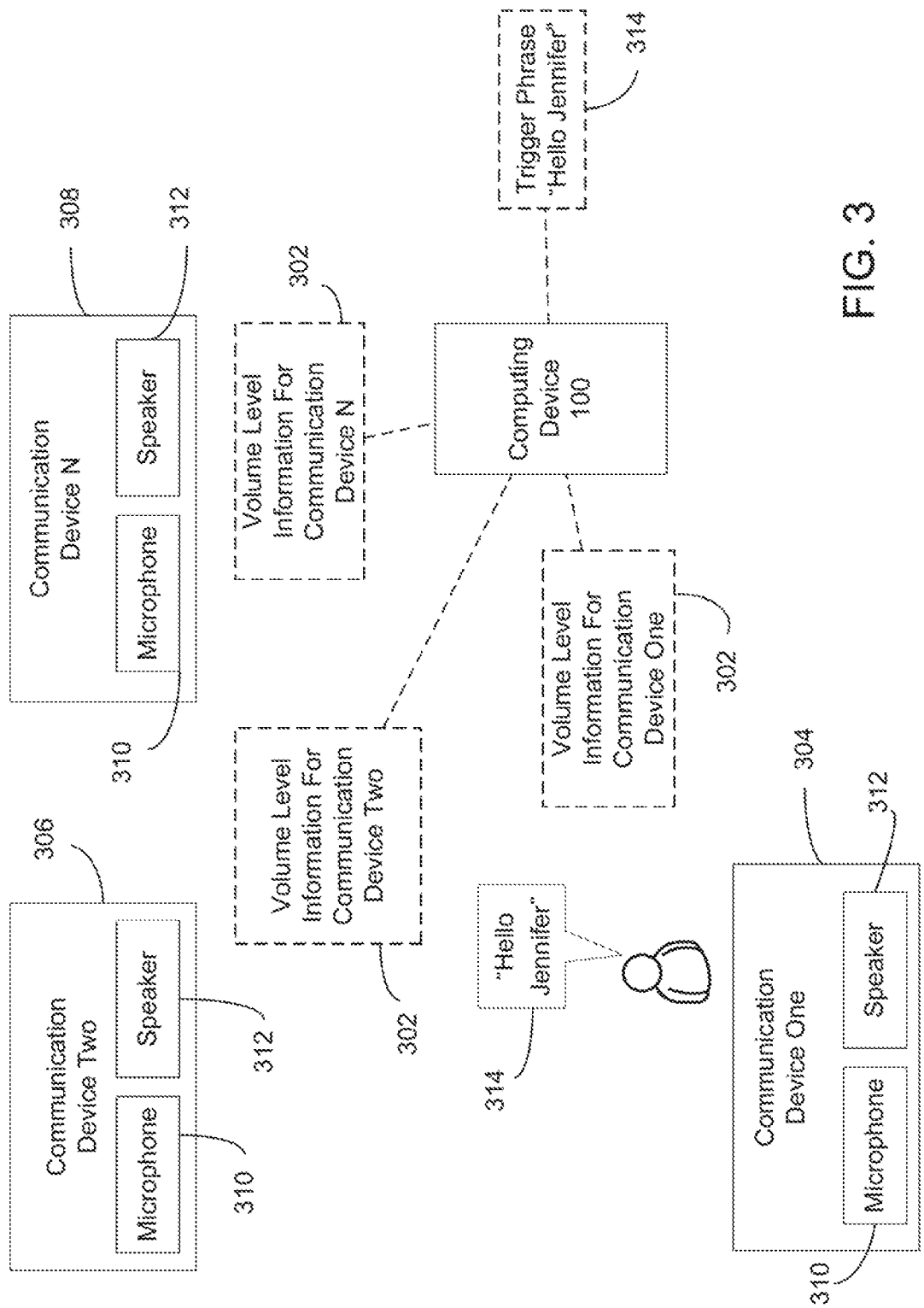
FIG. 3 illustrates an example of identification of a preferred communication device.

FIG. 3, in view of FIGS. 1, and 2, illustrates an example of identification of preferred communication devices. In this example a user speaks a phrase "Hello Jennifer" 314 in an environment in which each of a set of computing devices (here Communication Device One 304, Communication Device Two 306, and Communication Device N 308) can detect the utterance. Each of Communication Device One 304, Communication Device Two 306, and Communication Device N 308 includes a microphone 310 and a speaker 312. Computing Device 100, which is wirelessly connected to each of Communication Device One 304, Communication Device Two 306, and Communication Device N 308, obtains volume level information 302 for each of the set of connected Communication Devices 304 306 308, and analyzes, the obtained volume level information 302 to determine the obtained volume level information 302 is indicative of predetermined trigger phrase 314 for a virtual assistant service.

In examples, analyzing the obtained volume level information 302 for each of Computing Device One 304, Computing Device Two 306, and Computing Device N 308 to determine that the volume level information 302 is indicative of a user-spoken trigger phrase 314 will include Computing Device 100 comparing the obtained volume level information to an audio volume signature for the trigger phrase. As discussed previously, in examples, the audio volume signature information for the trigger phrase may be information that was stored locally or externally as a result of training operation conducted at Computing Device 100. In other examples, the audio volume signature information for the trigger phrase may be information obtained from a memory (e.g., accessing a stored database) or from an application (hosted locally or hosted by another computing device) that is to provide audio volume signature for a set of trigger words, or for words or utterances generally, without performance of training operation at computing device 100.

Continuing with the example of FIG. 3, Computing Device 100 in turn identifies Computing Device One 304 as the preferred communication device among the set of communication devices 304 306 308 according to an audio preference rule. In examples, the audio preference rule may include one or all of audio volume, audio frequency, and/or other audio attributes as factors.

In certain examples, Computing Device 100 may, following the identification of Communication Device One 304 as the preferred communication device, send trigger data indicative of the detected trigger phrase to a system that hosts a virtual assistant service. In examples, the hosting system may be local to, or external to, Computing Device 100. After the virtual assistant service determines an appropriate response to the trigger data, the system hosting the virtual assistant service may send a response phrase to Computing Device 100. For instance, if the trigger data is indicative of the trigger phrase 314 "Hey Jennifer", and the trigger phrase 314 is to wake up the virtual assistant service running at the receiving system, the receiving system may send to Computing Device 100 a response phrase "How may I help you today?." Computing Device 100 would in turn send the response phrase to the preferred Communication Device One 304 for output via speaker 312 included within preferred Communication Device One 304.

Continuing with the example of FIG. 3, Computing Device may receive from the preferred Communication Device One 304 microphone data indicative of an audio clip that was received or captured at preferred Communication Device One 304, and send the microphone data to the system that hosts the virtual assistant service. In this example, the virtual assistant service would determine an appropriate response to the audio clip based upon the microphone data. The system hosting the virtual assistant service would in turn send the response phrase to Computing Device 100 and Computing Device 100 would receive such determined response phrase. Computing Device 100 would in turn send the received response phrase to the preferred Communication Device One 304 for output via its speaker 312. For instance, if the microphone data is indicative of an inquiry "How is the traffic on my work commute today?", the virtual assistant service running at the receiving system may determine an appropriate response phrase "There are no delays." Computing Device 100 would in turn send the "There are no delays" response phrase to the preferred Communication Device One 304 for output via its speaker 312.

Figure 4:
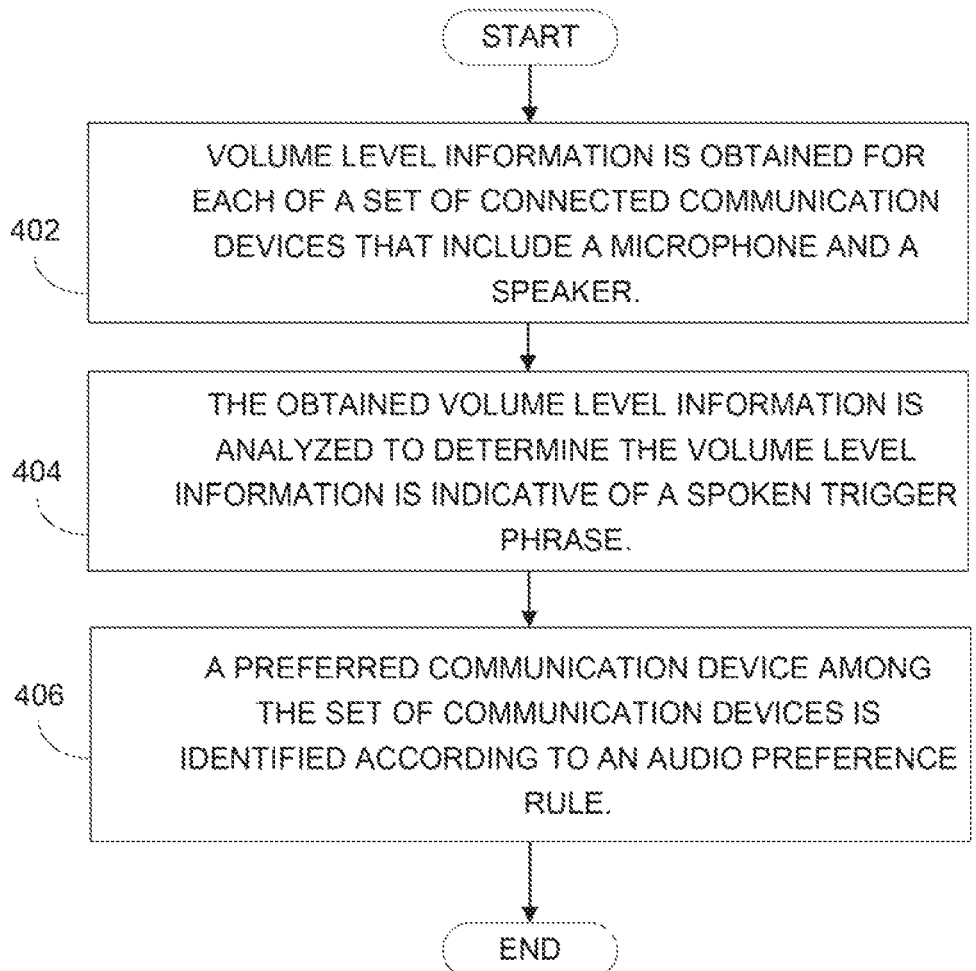
FIG. 4 is a flow diagram depicting implementation of an example of identification of a preferred communication device.

FIG. 4 is a flow diagram of implementation of a method for identification of preferred communication devices. In discussing FIG. 4, reference may be made to the components depicted in FIGS. 1 and 2. Such reference is made to provide contextual examples and not to limit the manner in which the method depicted by FIG. 4 may be implemented. Volume level information is obtained for each of a set of connected communication devices that include a microphone and a speaker (block 402). Referring back to FIGS. 1 and 2, volume level receipt engine 102 (FIG. 1) or volume level receipt module 202 (FIG. 2), when executed by processing resource 240, may be responsible for implementing block 402.

The obtained volume level information is analyzed to determine the volume level information is indicative of a spoken trigger phrase (block 404). Referring back to FIGS. 1 and 2, trigger phrase identification engine 104 (FIG. 1) or trigger phrase identification module 204 (FIG. 2), when executed by processing resource 240, may be responsible for implementing block 404.

A preferred communication device is identified among the set of communication devices according to an audio preference rule (block 406). Referring back to FIGS. 1 and 2, preferred communication device identification engine 106 (FIG. 1) or preferred communication device identification module 206 (FIG. 2), when executed by processing resource 240, may be responsible for implementing block 406.

Figure 5:
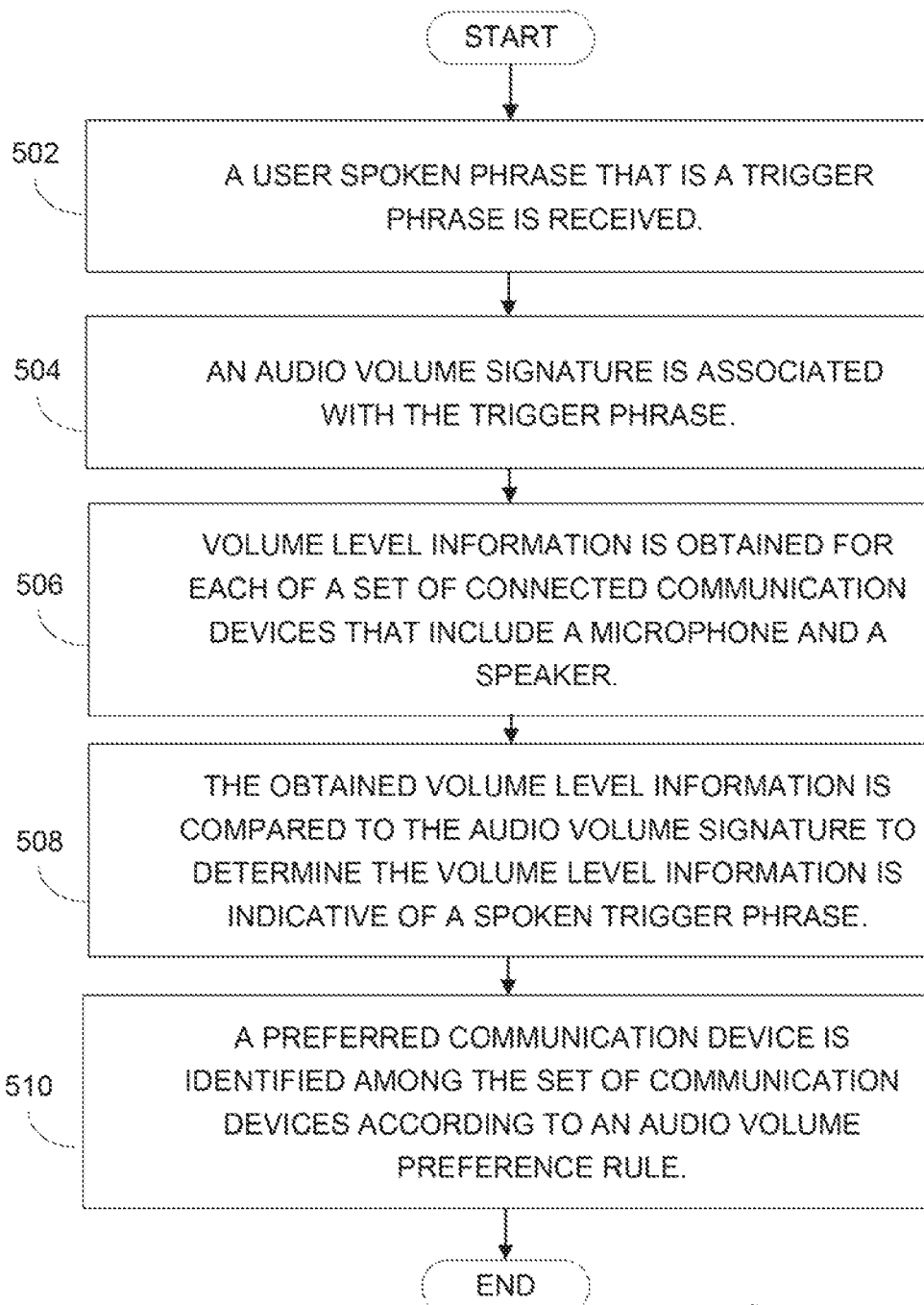
FIG. 5 is a flow diagram depicting implementation of an example of identification of a preferred communication device, the method including a training operation to receive a user spoken phrase that is a trigger phrase and associate an audio volume signature with the trigger phrase.

FIG. 5 is a flow diagram of implementation of a method for identification of preferred communication devices. In discussing FIG. 5, reference may be made to the components depicted in FIGS. 1 and 2. Such reference is made to provide contextual examples and not to limit the manner in which the method depicted by FIG. 5 may be implemented. A user spoken phrase that is a trigger phrase is received (block 502). Referring back to FIGS. 1 and 2, training engine 108 (FIG. 1) or training module 208 (FIG. 2), when executed by processing resource 240, may be responsible for implementing block 502.

An audio volume signature is associated with the trigger phrase (block 504). Referring back to FIGS. 1 and 2, training engine 108 (FIG. 1) or training module 208 (FIG. 2), when executed by processing resource 240, may be responsible for implementing block 504.

Volume level information is obtained for each of a set of connected communication devices that include a microphone and a speaker (block 506). Referring back to FIGS. 1 and 2, volume level receipt engine 102 (FIG. 1) or volume level receipt module 202 (FIG. 2), when executed by processing resource 240, may be responsible for implementing block 506.

The obtained volume level information is compared to the audio volume signature to determine the volume level information is indicative of a spoken trigger phrase (block 508). Referring back to FIGS. 1 and 2, trigger phrase identification engine 104 (FIG. 1) or trigger phrase identification module 204 (FIG. 2), when executed by processing resource 240, may be responsible for implementing block 508.

A preferred communication device is identified among the set of communication devices according to an audio volume preference rule (block 510). Referring back to FIGS. 1 and 2, preferred communication device identification engine 106 (FIG. 1) or preferred communication device identification module 206 (FIG. 2), when executed by processing resource 240, may be responsible for implementing block 510.

Figure 6:
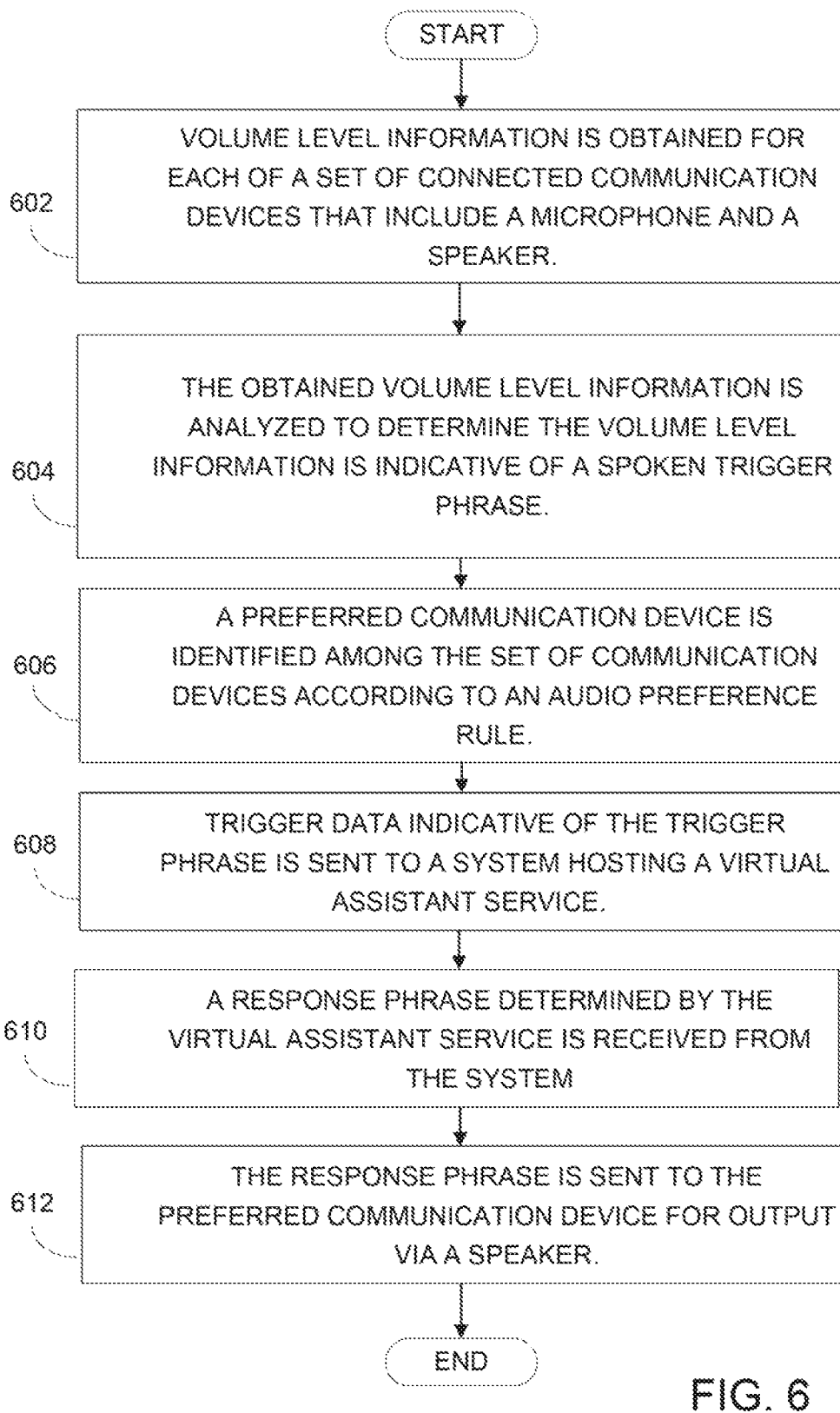
FIG. 6 is a flow diagram depicting implementation of an example of identification of a preferred communication device, the method including sending a trigger phrase to a system hosting a virtual assistant service, receiving a response phrase from the system, and sending the response phrase to the preferred communication device for output.

FIG. 6 is a flow diagram of implementation of a communication method utilizing multiple virtual assistant services. In discussing FIG. 6, reference may be made to the components depicted in FIGS. 1 and 2. Such reference is made to provide contextual examples and not to limit the manner in which the method depicted by FIG. 6 may be implemented. Volume level information is obtained for each of a set of connected communication devices that include a microphone and a speaker (block 602). Referring back to FIGS. 1 and 2, volume level receipt engine 102 (FIG. 1) or volume level receipt module 202 (FIG. 2), when executed by processing resource 240, may be responsible for implementing block 602.

The obtained volume level information is analyzed to determine the volume level information is indicative of a spoken trigger phrase (block 604). Referring back to FIGS. 1 and 2, trigger phrase identification engine 104 (FIG. 1) or trigger phrase identification module 204 (FIG. 2), when executed by processing resource 240, may be responsible for implementing block 604.

A preferred communication device is identified among the set of communication devices according to an audio preference rule (block 606). Referring back to FIGS. 1 and 2, preferred communication device identification engine 106 (FIG. 1) or preferred communication device identification module 206 (FIG. 2), when executed by processing resource 240, may be responsible for implementing block 606.

Trigger data indicative of the trigger phrase is sent to a system hosting a virtual assistant service (block 608). Referring back to FIGS. 1 and 2, trigger phrase sending engine 110 (FIG. 1) or trigger phrase sending module 210 (FIG. 2) when executed by processing resource 240, may be responsible for implementing block 608.

A response phrase determined by the virtual assistant service is received from the system (block 610). Referring back to FIGS. 1 and 2, response receipt engine 112 (FIG. 1) or response receipt module 212 (FIG. 2), when executed by processing resource 240, may be responsible for implementing block 610.

The response phrase is sent to the preferred communication device for output via a speaker (block 612). Referring back to FIGS. 1 and 2, response sending engine 114 (FIG. 1) or response sending module 214 (FIG. 2), when executed by processing resource 240, may be responsible for implementing block 612.

FIGS. 1-6 aid in depicting the architecture, functionality, and operation of various examples. In particular. FIGS. 1 and 2 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagrams of FIGS. 4-6 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive.

What is claimed is:

1. A computing device, comprising:
   a volume level receipt engine to obtain volume level information for each of a set of connected communication devices that include a microphone and a speaker, the volume level information including a representation of measured audio signal strength;
   a trigger phrase identification engine to analyze the obtained volume level information to determine the volume level information is indicative of a spoken trigger phrase received at the volume level receipt engine and to compare the received trigger phrase to a stored audio volume signature for the trigger phrase to distinguish the trigger phrase from other phrases; and
   a preferred communication device identification engine to identify a preferred communication device among the set of communication devices according to an audio preference rule based on the comparison of the received trigger phrase to the stored audio volume signature and to assign the preferred communication device as a default communication device of the connected communication devices according to the audio preference rule for transactions with a virtual assistant service of user data indicative of a user spoken phrase detected at a microphone of the default communication device that is other than the trigger phrase within a selected time of the trigger phrase and provide a response via the default communication device, the audio preference rule including factors of the measured audio signal strength and audio frequency.

2. The computing device of claim 1, further comprising:
   a trigger phrase sending engine to send trigger data indicative of the trigger phrase to a system hosting a virtual assistant service;

a response receipt engine to receive from the system a response phrase determined by the virtual assistant service; and a response sending engine to send the response phrase to the preferred communication device for output via a speaker.

3. The computing device of claim 2, further comprising a microphone data engine to receive from the preferred communication device microphone data indicative of an audio clip received at the preferred communication device, and to send the microphone data to the system, and wherein the received response phrase is determined by the virtual assistant service based upon the microphone data.

4. The computing device of claim 3, wherein the microphone data is data that was buffered at the preferred communication device and the audio clip is a phrase spoken by a user immediately following utterance of the trigger phrase.

5. The computing device of claim 3, wherein the microphone data is data that was buffered by the preferred communication device and the audio clip is a phrase spoken by a user within a predetermined time period following utterance of the trigger phrase.

6. The computing device of claim 3, wherein the microphone data is data that was buffered by the computing device and the audio clip is a phrase spoken by a user within a predetermined time period following utterance of the trigger phrase.

7. The computing device of claim 1, wherein the audio preference rule is a rule that includes audio volume as a factor.

8. The computing device of claim 1, wherein the trigger phrase is a phrase unique to a virtual assistant service and is to wake the virtual assistant service when received at a system hosting the virtual assistant service.

9. The computing device of claim 1, wherein the trigger phrase identification engine is to determine the volume level information is within an expected frequency range.

10. The computing device of claim 1, further comprising a training engine to receive a user spoken phrase that is the trigger phrase and to store an audio volume signature for the trigger phrase, and wherein the trigger phrase identification engine is to analyze obtained volume level information by comparing to the audio volume signature.

11. A communication method, comprising:
receiving a user spoken phrase that is a trigger phrase;
associating an audio volume signature with the trigger phrase;
obtaining volume level information for each of a set of connected communication devices that include a microphone and a speaker, the volume level information including a representation of measured audio signal strength;
comparing the obtained volume level information to the audio volume signature to determine the volume level information is indicative of a spoken trigger phrase; and
identifying a preferred communication device among the set of communication devices according to an audio volume preference rule based on the comparison and to assign a default communication device of the connected communication devices according to the audio preference rule for transactions with a virtual assistant service, the audio preference rule including factors of the measured audio signal strength and audio frequency; and
providing user data indicative of a user spoken phrase detected at a microphone of the default communication device that is other than the trigger phrase within a selected time of the trigger phrase and receive a response via the default communication device.

12. The method of claim 11, wherein the trigger phrase is a phrase unique to a virtual assistant service and is to wake the virtual assistant service when received at a system hosting the virtual assistant service.

13. A memory resource storing instructions that when executed cause a processing resource to effect a communication operation at a computing device, the instructions comprising:
a volume level receipt module that when executed causes the processing resource to obtain volume level information for each of a set of connected communication devices that include a microphone and a speaker, the volume level information including a representation of measured audio signal strength;
a trigger phrase identification module that when executed causes the processing resource to analyze the obtained volume level information to determine the volume level information is indicative of a spoken trigger phrase received at the volume level receipt engine and to compare the received trigger phrase to a stored audio volume signature for the trigger phrase to distinguish the trigger phrase from other phrases;
a preferred communication device identification module that when executed causes the processing resource to identify a preferred communication device among the set of communication devices according to an audio preference rule based on the comparison of the received trigger phrase to the stored audio volume signature and to assign the preferred communication device as a default communication device of the connected communication devices for transactions with a virtual assistant service and provide a response via the default communication device, the audio preference rule including factors of the measured audio signal strength and audio frequency;
a trigger phrase sending module that when executed causes the processing resource to send trigger data indicative of the trigger phrase to a system hosting a virtual assistant service;
a microphone data engine that when executed causes the processing resource to provide to the virtual assistant service data that is indicative of a user spoken phrase detected at a microphone of the default communication device that is other than the trigger phrase;
a response receipt module that when executed causes the processing resource to receive from the system a response phrase determined by the virtual assistant service; and
a response sending module that when executed causes the processing resource to send the response phrase to the preferred communication device for output via a speaker.

14. The memory resource of claim 13, wherein the trigger phrase sending module when executed is to cause the processing resource to, following the sending of the trigger data to the system, send microphone data indicative of the user spoken phase that was captured at the preferred communication device.

15. The memory resource of claim 14, wherein the microphone data is indicative of a user spoken phase that was captured at the preferred communication device within a predetermined time period following capture of the trigger phrase.

* * * * *